(12) United States Patent
Schade et al.

(10) Patent No.: US 8,989,538 B2
(45) Date of Patent: Mar. 24, 2015

(54) SENSOR ELEMENT AND METHOD FOR THE PRODUCTION THEREOF AND USE THEREOF

(75) Inventors: Wolfgang Schade, Goslar (DE); Norbert Keil, Berlin (DE); Martin Angelmahr, Hemsbach (DE); Peter Funken, Frechen (DE)

(73) Assignees: Fraunhofer-Gesellschaft zur Förderung der angewandten Forschung e.V., Munich (DE); Draka Cable Wuppertal GmbH, Wuppertal (DE)

( * ) Notice: Subject to any disclaimer, the term of this patent is extended or adjusted under 35 U.S.C. 154(b) by 310 days.

(21) Appl. No.: 13/574,690

(22) PCT Filed: Jan. 24, 2011

(86) PCT No.: PCT/EP2011/050895
§ 371 (c)(1),
(2), (4) Date: Aug. 20, 2012

(87) PCT Pub. No.: WO2011/089244
PCT Pub. Date: Jul. 28, 2011

(65) Prior Publication Data
US 2012/0321242 A1    Dec. 20, 2012

(30) Foreign Application Priority Data
Jan. 25, 2010   (DE) .......................... 10 2010 001 197

(51) Int. Cl.
G02B 6/34     (2006.01)
G01D 5/353    (2006.01)
G02B 6/00     (2006.01)

(52) U.S. Cl.
CPC ................................ G01D 5/35383 (2013.01)
USPC .............................................. 385/37; 385/12

(58) Field of Classification Search
CPC ................................................... G01D 5/35383
USPC ......................................................... 385/12, 37
See application file for complete search history.

(56) References Cited

U.S. PATENT DOCUMENTS 5,054,935 A * 10/1991 Tanabe et al. ................ 374/131
5,272,334 A * 12/1993 Sai ........................... 250/227.21
(Continued)

FOREIGN PATENT DOCUMENTS

| DE | 10 2006 015 159 A1 | 10/2007 | ............. G01B 11/16 |
| DE | 602 21 1681 T2 | 4/2008 | ............. G01D 5/353 |

(Continued)

OTHER PUBLICATIONS

Grobnic, D., Mihailov, S.: Femtosecond IR Laser Inscription of Bragg Gratings in Single- and Multimode Fluoride Fibers, IEEE Photon. Technol. Lett, vol. 18, Nr. 18, 2006, S2686-2688.

(Continued)

*Primary Examiner* — Rhonda Peace
(74) *Attorney, Agent, or Firm* — Brinks Gilson & Lione

(57) ABSTRACT

A sensor element for detecting mechanical state variables contains at least one optical waveguide having at least one fiber Bragg grating, and at least one planar optical filter element to which light exiting the optical waveguide can be fed to at least one measuring device for determining an intensity ratio of a Stokes and an anti-Stokes lines and/or a propagation time of an optical signal. A method for detecting mechanical state variables uses such a sensor element running along a measuring section, wherein light having at least one predefinable mean wavelength and a predefinable spectral width is coupled into the optical waveguide and light reflected and/or scattered in the optical waveguide is fed to at least two measuring devices, measuring the intensity of the light exiting the optical waveguide in selected spectral ranges, and measuring an intensity ratio of a Stokes and an Anti-stokes line and/or a propagation time of an optical signal.

17 Claims, 5 Drawing Sheets

(56) References Cited

U.S. PATENT DOCUMENTS

| | | | |
|---|---|---|---|
| 5,361,130 | A | 11/1994 | Kersey et al. |
| 5,416,467 | A | 5/1995 | Ohta et al. .................... 340/555 |
| 5,449,233 | A * | 9/1995 | Sai et al. ....................... 374/161 |
| 5,618,108 | A * | 4/1997 | Sai et al. ....................... 374/161 |
| 5,639,162 | A * | 6/1997 | Sai ................................ 374/161 |
| 5,680,489 | A | 10/1997 | Kersey ........................... 385/12 |
| 5,755,512 | A * | 5/1998 | White .......................... 374/161 |
| 5,765,948 | A * | 6/1998 | Sai ................................ 374/161 |
| 5,825,804 | A * | 10/1998 | Sai ................................ 374/137 |
| 7,126,680 | B2 * | 10/2006 | Yamate et al. ............... 356/73.1 |
| 7,215,416 | B2 * | 5/2007 | Yamate et al. ............... 356/73.1 |
| 7,355,163 | B2 * | 4/2008 | Watley et al. ............ 250/227.14 |
| 7,480,460 | B2 | 1/2009 | Colpitts et al. |
| 7,628,531 | B2 * | 12/2009 | Lee et al. ......................... 374/1 |
| 7,765,835 | B2 | 8/2010 | Karayianni et al. |
| 2002/0025097 | A1 * | 2/2002 | Cooper et al. .................. 385/12 |
| 2003/0234921 | A1 * | 12/2003 | Yamate et al. ............... 356/73.1 |
| 2004/0113056 | A1 | 6/2004 | Everall et al. ............ 250/227.23 |
| 2005/0140966 | A1 * | 6/2005 | Yamate et al. ............... 356/73.1 |
| 2005/0146076 | A1 | 7/2005 | Alexander et al. |
| 2006/0209291 | A1 * | 9/2006 | Yamate et al. ............... 356/73.1 |
| 2006/0239330 | A1 * | 10/2006 | Yamate et al. ................. 374/161 |
| 2007/0171402 | A1 * | 7/2007 | Watley et al. ................. 356/73.1 |
| 2007/0223556 | A1 * | 9/2007 | Lee et al. ........................... 374/1 |
| 2009/0114007 | A1 * | 5/2009 | Csutak ........................ 73/152.12 |
| 2011/0292377 | A1 * | 12/2011 | Osenberg et al. ................. 356/73 |
| 2012/0321242 | A1 * | 12/2012 | Schade et al. ................... 385/12 |

FOREIGN PATENT DOCUMENTS

| | | | |
|---|---|---|---|
| DE | 102010001197.5 A1 | 7/2011 | |
| EP | 0 509 537 A2 | 10/1992 | ........... G08B 13/186 |
| EP | 1826545 A2 | 8/2007 | |
| GB | 2 400 171 A | 10/2004 | ........... G01B 11/24 |
| WO | WO 2004/001356 A2 | 12/2003 | |

OTHER PUBLICATIONS

Rao, Y.J., Jackson, D.A.: Strain sensing of modern composite materials with a spatialy-wavelength-division multiplexed fiber grating network. Opt. Lett. vol. 21, Nr. 9, 1966, S.683-685.

Hill, Kenneth O. et al., Fiber Bragg Grating Technology Fundamentals and Overview, Aug. 1997, pp. 1263-1276, vol. 15, No. 8, Journal of Lightwave Technology, IEEE.

* cited by examiner

SENSOR ELEMENT AND METHOD FOR THE PRODUCTION THEREOF AND USE THEREOF

TECHNICAL FIELD

The invention relates to a sensor element and to a method for capturing mechanical state variables, comprising at least one optical waveguide, wherein at least one fiber Bragg grating is located in the optical waveguide, wherein the sensor element has at least one planar-optical filter element to which light exiting the optical waveguide can be supplied.

EP 05 09 537 A2 discloses a sensor element of the type mentioned. The sensor element comprises an optical fiber on which an optical signal is transmitted. Under the action of mechanical stress, the optical signal becomes distorted, and the distortions can be determined using associated measurement electronics. A disadvantage, however, is the high outlay in terms of apparatus for detecting the signal distortion, such that use of this known sensor element is limited to a few fields of application.

Proceeding from this prior art, it is an object of the invention to provide a sensor element for measuring mechanical state variables which can provide the required measurement values with little outlay and thus more cost-effectively.

SUMMARY OF THE INVENTION

The following description should be understood such that a stated feature is present in at least one embodiment of the invention. This does not preclude the presence of further features. Where the claims define "first" and "second" features, this designation serves to differentiate between two similar features without specifying any particular preference.

In one embodiment, the invention relates to a sensor element for capturing mechanical state variables, comprising at least one optical waveguide, wherein a plurality of fiber Bragg gratings are located in the optical waveguide.

In one embodiment, the invention relates to a sensor element, which furthermore comprises at least a first light source and a second light source whose light can be coupled into the at least one optical waveguide.

In one embodiment, the invention relates to a sensor element, in which the first light source comprises at least one superluminescent diode and/or the second light source comprises a short-pulse laser, in particular a Q-switched microchip laser. In some embodiments, the first light source can have a first wavelength and the second light source can have a second wavelength which differs from the first wavelength. In some embodiments of the invention, the first light source and the second light source can operate in a pulsed manner, with the pulse and pause times being matched to each other such that not both light sources emit light at the same time.

In one embodiment, the invention relates to a sensor element, which furthermore comprises at least one planar-optical filter element with which the light from the first light source exiting the optical waveguide can be received. In some embodiments of the invention, the sensor element can comprise a plurality of parallel planar-optical filter elements, to which the light reflected in the optical waveguide can be at least partially supplied using at least one coupler and/or a multiplexer. In some embodiments of the invention, the acceptance curves of the individual channels of the planar-optical filter elements have in each case different wavelengths. In some embodiments of the invention, adjacent channels can differ by approximately 2 nm to approximately 10 nm. In some embodiments of the invention, the planar-optical filter element can comprise an arrayed waveguide chip and/or a directional coupler and/or a delay line interferometer and/or a Mach Zehnder interferometer.

In one embodiment, the invention relates to a sensor element, in which at least one fiber Bragg grating is obtainable by irradiating predefined longitudinal sections of the optical waveguide with femtosecond laser pulses.

In one embodiment, the invention relates to a sensor element, in which the light from the second light source exiting the optical waveguide can be supplied to a device for determining the intensity ratios of the Stokes and anti-Stokes lines and/or to a device for determining the propagation time of the light.

In one embodiment, the invention relates to a sensor element, in which the individual fiber Bragg gratings out of the plurality of fiber Bragg gratings have in each case a different lattice constant.

In one embodiment, the invention relates to a sensor element, in which the minima of the acceptance ranges of the arrayed waveguide chip, which minima are located between the channels, approximately correspond to the wavelengths reflected by the fiber Bragg gratings if no mechanical stress acts on the fiber Bragg gratings.

In one embodiment, the invention relates to a sensor element, which furthermore comprises a multiplexer via which a plurality of optical waveguides can be connected sequentially to at least one light source and/or to at least one measurement device.

In one embodiment, the invention relates to a sensor element, in which the optical waveguide has a core and a cladding, the material of the core being nominally undoped.

In one embodiment, the invention relates to a method for capturing mechanical state variables, in which at least one optical waveguide, into which a plurality of fiber Bragg gratings are introduced, extends along a measurement distance, wherein light of at least a predefinable center wavelength and of a predefinable spectral width is coupled into the optical waveguide and light reflected in the optical waveguide is supplied to a measurement device. In one embodiment, the invention relates to a method, in which spectrally broadband radiation from a first light source and pulsed, spectrally narrowband radiation from the second light source are supplied to the optical waveguide. In some embodiments, the spectrally narrowband radiation can have a wavelength which differs from the wavelengths of the spectrally broadband radiation.

In one embodiment, the invention relates to a method, in which the propagation time and/or the ratio of the Stokes and anti-Stokes lines of the radiation emitted by the second light source and reflected in the optical waveguide is/are determined in the measurement device, and/or the intensity of the radiation emitted by the first light source and reflected in the optical waveguide in predefinable spectral ranges is determined in the measurement device. The predefinable spectral ranges can be selected by way of the channel width of at least one arrayed waveguide chip.

In one embodiment, the invention relates to a method for producing a sensor element, which comprises the following steps: providing an optical waveguide having a core and a cladding, the material of the core being nominally undoped; producing a plurality of fiber Bragg gratings with predefinable lattice constant by irradiating predefinable longitudinal sections of the optical waveguide with femtosecond laser pulses.

In one embodiment, the invention relates to a method, which furthermore comprises the following steps: measuring the wavelengths of the edges of the acceptance ranges of at least one arrayed waveguide chip; producing a plurality of fiber Bragg gratings which are adapted to reflect in each case light with the wavelength of an edge of an acceptance range; connecting the arrayed waveguide chip to the optical waveguide.

In one embodiment, the invention relates to a sail, comprising at least one sensor element described above. In one embodiment, the invention relates to a cable which comprises at least a sensor element described above. In one embodiment, the invention can relate to a line or a rope which comprises at least one sensor element described above. Such a sensor element can be placed in a sail or in a line or in a rope by way of lamination or adhesive bonding or interweaving. The sensor element can be placed in a cable during extrusion or injection molding of the insulation. In some embodiments of the invention, exactly one sensor element can be arranged in the center of a round cable such that a cylindrically symmetric construction is produced.

In one embodiment, the invention relates to a method for controlling a steerable kite or a sail, in which the forces acting on the steerable kite or the sail are measured and an operating device such as a sheet and/or a guy and/or a boom and/or a trim device for changing the profile shape and/or the positioning of the sail or of the steerable kite is influenced automatically.

In one embodiment, the invention relates to a method for monitoring a cable connection, in which the mechanical load and/or the temperature distribution along the cable connection are measured using the sensor element. In some embodiments of the invention, a lifetime prediction can be calculated from the measured data.

BRIEF DESCRIPTION OF THE FIGURES

The invention will be explained in more detail below using figures and exemplary embodiments. In the figures.

DETAILED DESCRIPTION

Figure 1:
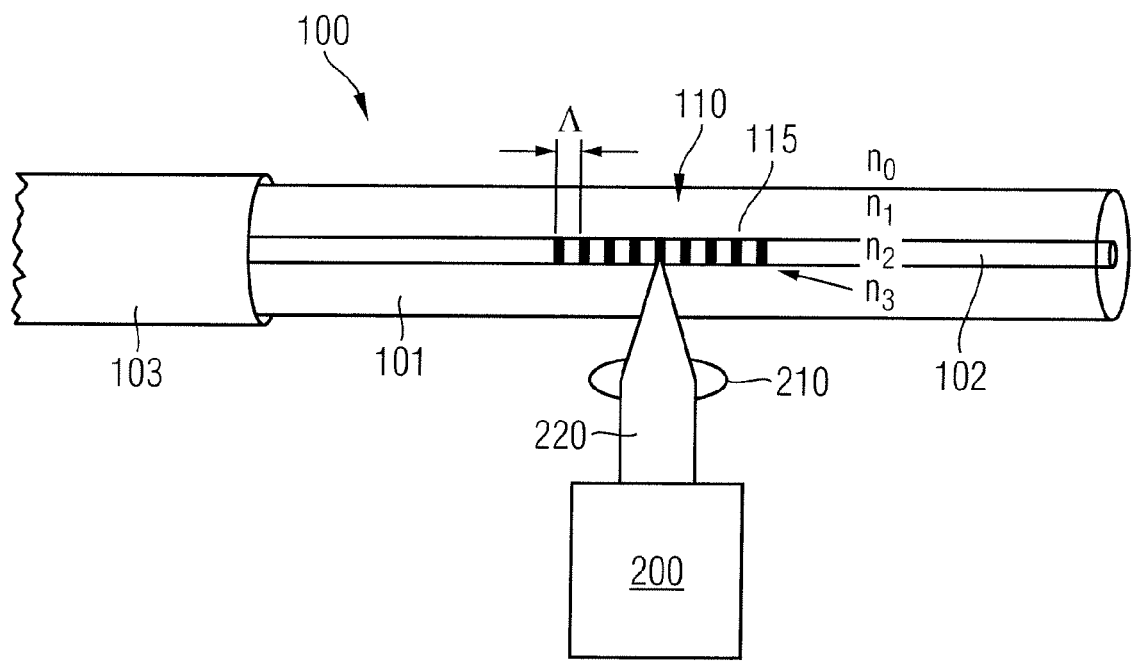
FIG. 1 shows a sensor element as proposed by the invention and a production method with which the sensor element can be obtained.

FIG. 1 shows a sensor element, which comprises an optical waveguide 100. The optical waveguide 100 comprises a cladding 101 and a core 102 arranged substantially concentrically in the cladding 101. For reasons of protection from stray light and mechanical damage, the core 101 can be surrounded by a protective sleeve 103.

The protective sleeve 103 can consist for example of a polymer. The protective sleeve 103 can be applied onto the cladding 101 using an extruder or an injection-molding method in a manner known per se. The cladding 101 and the core 102 can likewise consist of a polymer, in particular an optically transparent polymer. The core 102 and the cladding 101 typically consist of glass, however, the glass can consist substantially of amorphous $SiO_2$. The glasses used for the cladding 101 and for the core 102 can be provided with a dopant, such that the cladding 101 and the core 102 have different refractive indices. FIG. 1 illustrates that the cladding 101 has a first refractive index $n_1$ and the core 102 has a second refractive index $n_2$. The transition between the cladding 101 and the core 102 can be step-wise. In other embodiments of the invention, the transition can be a graduated transition, such that the refractive index $n_2$ gradually merges into the refractive index $n_1$. The core 102 can have a diameter of approximately 2 μm to approximately 5 μm.

In some embodiments of the invention, the core 102 of the optical waveguide 100 is nominally undoped. This does not preclude the presence of unavoidable contamination in the material of the core. In this way, the optical waveguide 100 can also be exposed to temperatures of more than 500° C., more than 700° C. or more than 900° C. without the optical waveguide 100 or the fiber Bragg grating 110 arranged in the optical waveguide 100 being damaged by diffusion of the dopants. In this case, the optical waveguide 100 can be a commercially available optical waveguide used for optical transmission of information.

At least one fiber Bragg grating 110 is introduced in the optical waveguide 100. The fiber Bragg grating comprises a plurality of longitudinal sections 115 with a third refractive index $n_3$. The third refractive index $n_3$ differs from the second refractive index $n_2$ of the core 102. The fiber Bragg grating 110 has a lattice constant A. The mode of action of the fiber Bragg grating 110 is explained in more detail with reference to FIG. 3.

To produce the fiber Bragg grating 110, a femtosecond laser 200 can be used in one embodiment of the invention. The femtosecond laser 200 can emit laser radiation 220 with a center wavelength of 800 nm. A single laser pulse can have a duration of approximately 10 fs to approximately 200 fs. In some embodiments of the invention, the laser radiation 220 can be focused using a focusing optical system 210 onto a beam spot of approximately 0.5 μm to approximately 2 μm.

The cladding 201 and the core 202 and the protective sleeve 103 of the optical waveguide 100 can be nominally transparent for the laser radiation 220. Therefore it is possible in some embodiments to focus the laser radiation 220 nearly without losses through the cladding 101 and the protective sleeve 103 into the core 102. Owing to the short duration of the laser pulses 220 and the high field strength brought about by the focusing, nonlinear effects occur in the material of the core 102, which nonlinear effects result in a change of the refractive index to the value $n_3$. Since the change in refractive index is not based on the presence of dopants in the longitudinal sections 115, the refractive index change in the longitudinal sections 115 and thus also the presence of the fiber Bragg grating 110 are not influenced by diffusion of dopants even at increased temperatures of the optical waveguide 100. The sensor element proposed according to the invention is thus distinguished by good long-term stability and the possibility of being used at high temperatures.

Figure 2:
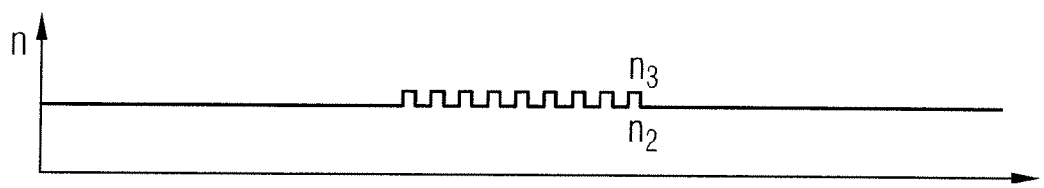
FIG. 2 shows the profile of the refractive index in a longitudinal section of the sensor element.

FIG. 2 once again illustrates the profile of the refractive index inside the core 102 of the optical waveguide 100. Plotted on the ordinate is here the refractive index n and plotted on the abscissa is the longitudinal extent of the waveguide 100. According to FIG. 2, the core 102 of the waveguide 100 has a refractive index $n_2$ over its uninterrupted length. Those longitudinal sections that are influenced by the laser radiation 220 display a higher refractive index $n_3$. Owing to the good focusability of the laser radiation 220, an approximately box-shaped refractive index profile is produced in a longitudinal section 115. A plurality of longitudinal sections 115, which are arranged one behind the other and have in each case the refractive index $n_3$, in that case form a fiber Bragg grating 110. The spacing between individual longitudinal sections 115 is designated lattice constant $\Lambda$ in the context of this description.

Figure 3:
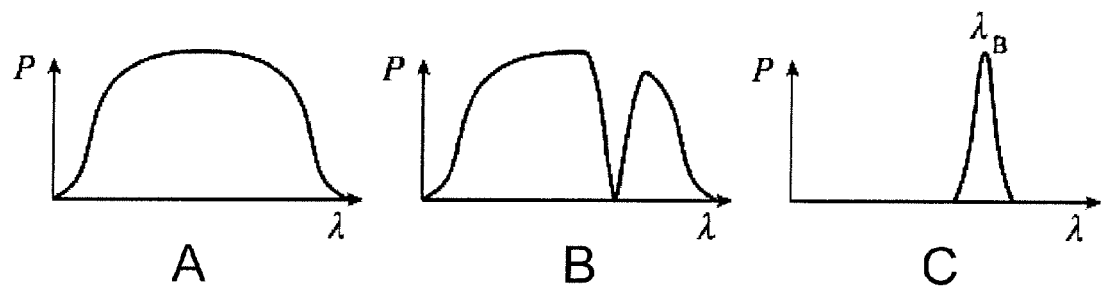
FIG. 3 shows the reflection and transmission behavior of the sensor element.

FIG. 3 shows the mode of action of a fiber Bragg grating 110 in an optical waveguide 100. Illustrated here is in each case an optical radiation intensity, or optical output P, on the ordinate, and the wavelength $\lambda$ on the abscissa.

FIG. 3A shows the intensity distribution of optical radiation that can be produced by a broadband light source. Such radiation can in some embodiments have a center wavelength of 1400 nm to 1700 nm. The spectral width can be between 50 nm and 300 nm. Such radiation as illustrated in FIG. 3A is coupled into an optical waveguide 100 which is provided with a fiber Bragg grating 110.

FIG. 3B shows the light provided at the output of the optical waveguide 100. The coupled-in radiation, as illustrated in FIG. 3A, is transmitted substantially unchanged. Only a narrow wavelength range with the center wavelength $\lambda_b$ and a spectral width of approximately 0.1 nm to approximately 2 nm is not transmitted by the optical waveguide 100. The spectral width and the center frequency $\lambda_b$ are influenced by the lattice constant $\lambda$ and the quality of the fiber Bragg grating.

FIG. 3C shows the reflected radiation that is detected on that end of the optical waveguide 100 that is used to couple in the radiation. The spectrum illustrated in FIG. 3C is complementary to that of the transmitted radiation, which is illustrated in FIG. 3B. Accordingly, radiation with the center frequency $\lambda_b$ can be detected at the input of the optical waveguide 100.

When mechanical stress acts on the optical waveguide 100 and results in an extension or compression of the optical waveguide, the lattice constant $\Lambda$ of the fiber Bragg grating 110 also changes. The wavelength $\lambda_b$ of the reflected radiation changes correspondingly thereto. In the same way, the wavelength $\lambda_b$ of the reflected radiation can also be influenced by a thermal expansion of the optical waveguide 100. By measuring the wavelength $\lambda_b$, the deformation of the waveguide 100 at the site of the fiber Bragg grating 110 can thus be determined.

Figure 4:
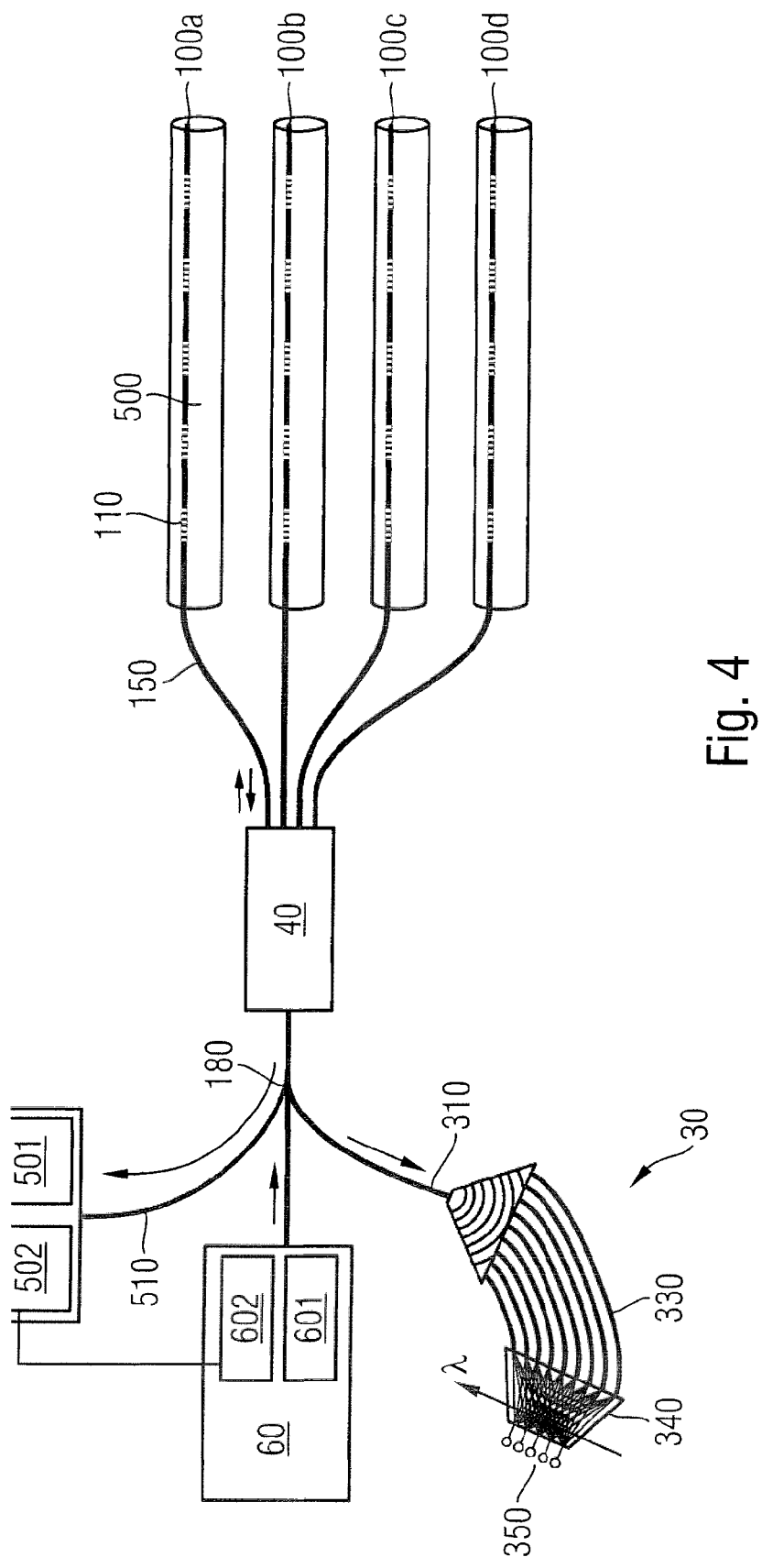
FIG. 4 shows a schematic of a signal read for a plurality of sensor elements.

FIG. 4 shows one embodiment of a signal read for a plurality of sensor elements. FIG. 4 illustrates by way of example four optical waveguides 100a, 100b, 100c and 100d. The number of optical waveguides 100 can of course also be greater or smaller in other embodiments of the invention. In some embodiments of the invention, the number of optical waveguides 100 can range from 1 to 200 or from 5 to 50.

Each of the optical waveguides 100 is provided with a plurality of fiber Bragg gratings 110. In the exemplary embodiment illustrated, each optical waveguide 100 has five fiber Bragg gratings 110. In other embodiments of the invention, the number of the fiber Bragg gratings 110 can be greater or smaller. It will typically range from 1 to approximately 50. In some embodiments, the spacing between two neighboring fiber Bragg gratings 110 is more than 10 cm. The longitudinal extent of a single fiber Bragg grating can range between 4 mm and approximately 10 mm.

In some embodiments of the invention, the various fiber Bragg gratings of an individual optical waveguide 100 have different lattice constants. Fiber Bragg gratings 110 of different optical waveguides, such as of optical waveguides 100a and 100b, can have the same lattice constant. Individual optical waveguides 100a, 100b, 100c and 100d can have a different number of fiber Bragg gratings 110 and/or the fiber Bragg gratings 110 can have a different spacing between one another.

The optical waveguides 100 in each case extend along a mechanical structure 500 whose deformation and/or load and/or temperature is intended to be determined. By way of example, the mechanical structure 500 can comprise an electric cable. The electric cable can be an underground cable or a submarine cable, for example, by way of which energy producers or energy consumers are connected to a public power grid. An energy producer can be a power plant, a wind power installation or a photovoltaic installation. The cable can further serve for connecting mobile energy consumers to a public power grid, for example connection of container lifting systems or earth-moving machines. The optical waveguides 100 can in these cases be used not only to detect sites with increased electrical resistance owing to the local temperature increase and to detect in this way pre-existing damage. The optical waveguides 100 can also be used to detect mechanical deformation of a cable by torsion or kinking and to establish, on the basis of the detected deformation cycles, a life-time prediction such that the cable can be replaced in good time before failure. Downtimes of the connected appliance can thus be minimized.

In some embodiments of the invention it is possible to connect an individual optical waveguide 100 to a light source and to an evaluation unit. In this way, a particularly high interrogation frequency and thus temporally close-meshed monitoring of the optical waveguide can occur. In other embodiments of the invention, a plurality of optical waveguides 100a, 100b, 100c and 100d can be connected to a multiplexer 40 using in each case associated connecting waveguides 150. The connecting waveguides 150 can be connected in one piece to the optical waveguide 100 which is used as a sensor element.

The multiplexer 40 connects the optical waveguides 100a, 100b, 100c and 100d cyclically to at least one light source 60 and at least one evaluation unit 30 and/or 50, such that the sensor elements are cyclically read and the obtained data can be visualized or stored.

The multiplexer 40 has, in the exemplary embodiment illustrated, a supply waveguide, via which light from a light source 60 can be guided to the respectively active optical waveguide 100. The light source 60 can for example provide a light spectrum as per FIG. 3A. For this purpose, the light source 60 can comprise a superlumiscent diode.

In other embodiments of the invention, the light source 60 can emit a pulsed laser beam, for example with a wavelength of approximately 1 µm to approximately 0.5 µm, and a pulse duration of approximately 0.5 ns to approximately 5 ns. For this purpose, the light source 60 can comprise a short-pulse laser, such as a Q-switched microchip laser.

In some embodiments of the invention, the light source 60 comprises a first light source 601, which provides spectrally broadband radiation. The first light source 601 can in this case be a pulsed light source or a continuous-wave source. The light source 60 also comprises a second light source 602, which emits pulsed and spectrally narrowband radiation. In some embodiments, the light emitted by the second light source 602 has a different wavelength than the light emitted by the first light source 601.

The light from the light source 60 travels through the optical waveguide 100 which is connected via the multiplexer 40 to the light source. At the various fiber Bragg gratings 110, in each case one prespecified spectral range of the light from the first light source 601 is reflected, while the remaining component of the light continues to travel through the optical waveguide 100. The light from the second light source 602 is scattered by Raman scattering along the optical waveguide 100 and cast back at least partially via the supply waveguide 150 and the multiplexer 40 in the direction of incidence.

The light reflected out or scattered out of the optical waveguide 100 reaches, via the node point 180, into two detection devices 30 and 50. Optionally an interference coupler can be provided at the node point 180 in order to divide the incoming light over two optical waveguides 310 and 510. In other embodiments, a simple spectrometer, which couples light of a first wavelength range into the waveguide 310 and light of a second wavelength range into the waveguide 510, can be provided at the node point 180.

The light emitted by the first light source 601 and reflected by the fiber Bragg grating 110 can be detected using a planar-optical filter element.

In some embodiments of the invention, the planar-optical filter elements can be produced from a material which has approximately the same refractive index as the waveguide 100. The mismatch of the signals can thus be reduced and the measurement accuracy of the sensor element can be increased.

In the embodiment as per FIG. 4, the planar-optical filter element is formed by at least one arrayed waveguide chip 30. The arrayed waveguide chip has a supply waveguide 310 which is used to supply the reflected components of the light to a coupler 320. In the coupler 320, the supplied signals propagate freely. The opposite end of the coupler 320 is adjoined by a plurality of optical waveguides 330, which each take up part of the optical signal. Owing to the differing lengths of the optical waveguides 330, phase shifts between the input signals occur at the input of the interference coupler 340.

Finally, in the interference coupler 340, the signals interfere with one another. As a result, a wavelength difference of the signals traveling in the supply waveguide 310 is imaged into a spatial difference at the output of the coupler 340.

Provided at the output of the coupler 340 is a photodiode array 350, which permits spatially resolved measurement of the optical signal. On the basis of the space determined in the photodiode array 350, the wavelength of the signal received via the supply waveguide 310 can be determined, and from the wavelength the respective fiber Bragg grating 110 on which the signal was reflected can be determined. If the fiber Bragg grating 110 has experienced a change in length owing to the mechanical stress, the change in length, and thus indirectly the acting force, can be determined on the basis of the measured wavelength.

In some embodiments, the arrayed waveguide grating 30 can be produced as a chip, in which the optical elements 320, 330 and 340 have been produced in a polymer using conventional lithography techniques and the photodiode array 350 is configured as an integrated indium phosphide diode line. The optical parts and the diode line can then be integrated on a substrate or at least in a circuit carrier or a housing. In this manner, a cost-effective and reliable construction of the signal readout is possible.

Figure 5:
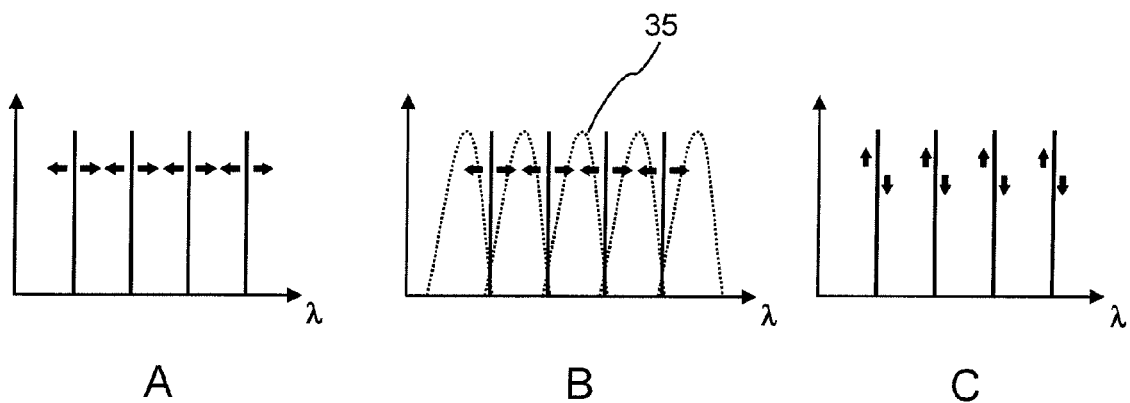
FIG. 5 illustrates the mode of operation of the signal reader.

The mode of functioning of the arrayed waveguide chip 30 is once again explained in more detail with reference to FIG. 5. Here, the figures again show an optical output or an intensity on the ordinate and the wavelength on the abscissa. FIG. 5A shows a line spectrum of five lines. Each line has a different center frequency $\lambda_b$, as was explained above in connection with FIG. 3C. Owing to the different scale of FIG. 5, compared to FIG. 3, the spectral width is not visible in FIG. 5A, in contrast to FIG. 3C. Each of the lines shown in FIG. 5A was reflected by a fiber Bragg grating 110 with respectively different lattice constants. In the case of a change in length of the respective longitudinal section of the optical waveguide 100, the wavelength of the associated reflection maximum shifts according to the change of the lattice constants. This shift as a function of the external measurement variable is indicated in each line by way of a double arrow.

FIG. 5B again shows the line spectrum from FIG. 5A. In addition, FIG. 5B shows the acceptance ranges 35 of a photodiode array 350 of an arrayed waveguide chip 30. FIG. 5B illustrates five acceptance ranges 35, corresponding to a diode array 350 with five photodiodes. In other embodiments of the invention, the arrayed waveguide grating 30 can have a diode array 350 with a greater or smaller number of diodes. The lattice constants of the fiber Bragg gratings 110 are chosen such that the reflection maxima of an uninterrupted optical waveguide 100 or of an uninterrupted fiber Bragg grating 110 are located between the acceptance curves 35 of the respective photodiodes. In this way, no signal, or only a low signal, can be detected on an uninterrupted optical waveguide 100 in the diode array 350.

If the lattice constant of a fiber Bragg grating is changed owing to external influences, the position of the corresponding line shifts in the spectrum as per FIG. 5B. In this manner, the line can enter the acceptance range 35 of a diode of the diode array 350. As a result, a corresponding signal of the respective diode is output. As illustrated in FIG. 5C, this form of signal readout leads to a variable amplitude at the output of the diode array 350. Thus, the wavelength modulation produced by the sensor element is converted into an amplitude modulation. The signal illustrated in FIG. 5C can then be processed further, visualized and stored in a manner known per se using analog and/or digital signal processing.

In another embodiment of the invention, the lattice constant of the fiber Bragg gratings can of course also be chosen such that the signals reflected by an uninterrupted optical waveguide are located in the maximum of the acceptance ranges 35. In this case, a change of the lattice constants produces attenuation of the signal of the respectively associated diode. In other embodiments of the invention, other filter elements can be used which have an edge in their acceptance curve.

If the number of the channels of an individual arrayed waveguide grating 30 is not sufficient to read all the fiber Bragg gratings 110 of an individual optical waveguide 100, the signals can additionally be discriminated on the basis of their propagation time. In other embodiments of the invention, a coupler can be arranged in the supply waveguide 310, which coupler divides the incoming signal over a plurality of arrayed waveguide gratings 30 which each cover different acceptance ranges 35.

The light emitted by the second light source 602 and cast back by Raman scattering is coupled into the measurement device 50 at the node point 180. The measurement device 50 comprises a device 501 which determines both the intensity of the Stokes line and the intensity of the anti-Stokes line. The ratio of the intensities can be determined from the measured amplitudes. On this basis, the temperature can be determined with an accuracy of approximately 1 K.

The device 50 can furthermore comprise a device 502 for measuring the signal propagation time. For this purpose, the device 502 receives a trigger from the light source 602, which marks the time a light pulse was emitted, and determines the time difference until the back-scattered radiation arrives. On the basis of the signal propagation time, the distance of the scatter point from the light source 602 can be determined in the device 502. In some embodiments of the invention, the accuracy of the space determination can be approximately 5 cm to approximately 50 cm. If an optional device 502 is present, the device 50 can thus determine the temperature along the mechanical structure 500 in a spatially resolved manner. If such a space-dependent temperature measurement is not present, or is not necessary, the device 501 can be used for measuring the average temperature of the optical waveguide 100. The temperature measurements from the device 50 can be used to correct the values measured in the arrayed waveguide grating 30. A thermal length change of the optical waveguide 100 can thus be distinguished from a length change owing to mechanical stress. The accuracy of the load measurement is thus increased.

In some embodiments, the device 502 can additionally be used to measure the temporal profile of the intensity of the radiation emitted by the second light source 602. Using the measured values for the temporal profile of the intensity, the spatial resolution of the temperature measurement can be improved further.

In some embodiments, the multiplexer 40 and/or the measurement device 50 and/or the arrayed waveguide grating 30 and/or the light source 60 can be connected by way of fiber coupling. The outlay for production is thus decreased and the reliability of the arrangement is thus increased.

Figure 6:
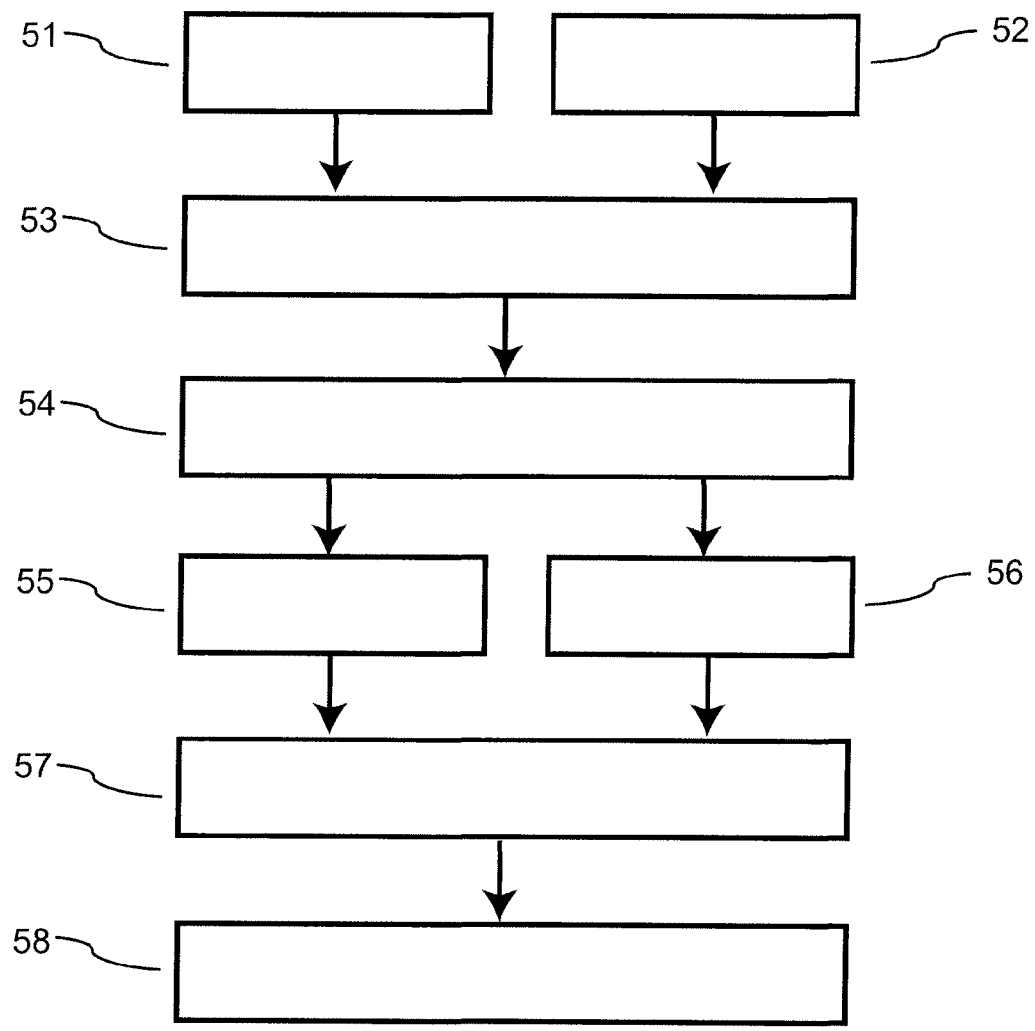
FIG. 6 shows the sequence of a measurement method proposed according to the invention.

The measurement method according to the invention is explained in more detail below with reference to FIG. 6. In method step 51, radiation is coupled from the first light source 601 into the waveguide 100. Light emission from the first light source 601 can in this case be pulsed or continuous. The light is provided to be reflected on the fiber Bragg gratings 110.

At the same time, in method step 52, radiation pulsed from the second light source 602 with a pulse duration of approximately 0.5 ns to approximately 5 ns and a repetition rate between 10 kHz and 1 MHz is continuously emitted. In other embodiments of the method, method steps 51 and 52 can also proceed sequentially.

The coupled-in electromagnetic radiation propagates along the optical waveguide 100. In method step 53, the electromagnetic radiation coupled-in in method step 51 is at least partially reflected on at least one fiber Bragg grating 110. Independently thereof, in method step 53, the electromagnetic radiation coupled-in in method step 52 is likewise scattered by Raman scattering and at least partially passes back to that end of the waveguide 100 which is used for coupling in the radiation.

In method step 54, the back-scattered light passes to the node point 180 and is divided there over the two receiving devices 30 and 50. In method step 55, the signal processing of the light reflected on the fiber Bragg gratings 110 is then carried out using the arrayed waveguide chip 30. At the end of method step 55, an electrical signal is available which is processed further in the following step 57.

In step 56, parallel or sequentially to method step 55, the Raman-scattered light signal is processed in the device 50. The device 50 can in this case carry out a propagation time measurement and/or ascertain the temperature at the location of the scattering by way of the ratio of the light intensity of the Stokes line and the anti-Stokes line.

In the following method step 57, the electrical signals can be processed further using an analog or digital electronics system. For example, the signals can be subjected to an amplification or an A/D conversion. Optionally, the received data can be visualized or stored in a database. In method step 57, provision may likewise be made for the data received in method step 55 to be corrected with the temperature value from method step 56.

The method step 57 can be followed by an optional step 58. In method step 58, an open-loop control signal and/or a closed-loop control signal, which influences the measurement variable, can be generated from the received measurement values by comparison with prespecified nominal values. Following this, the method can start again from the beginning in order to control the remaining deviations or the influence of the control action on the measurement variable.

Figure 7:
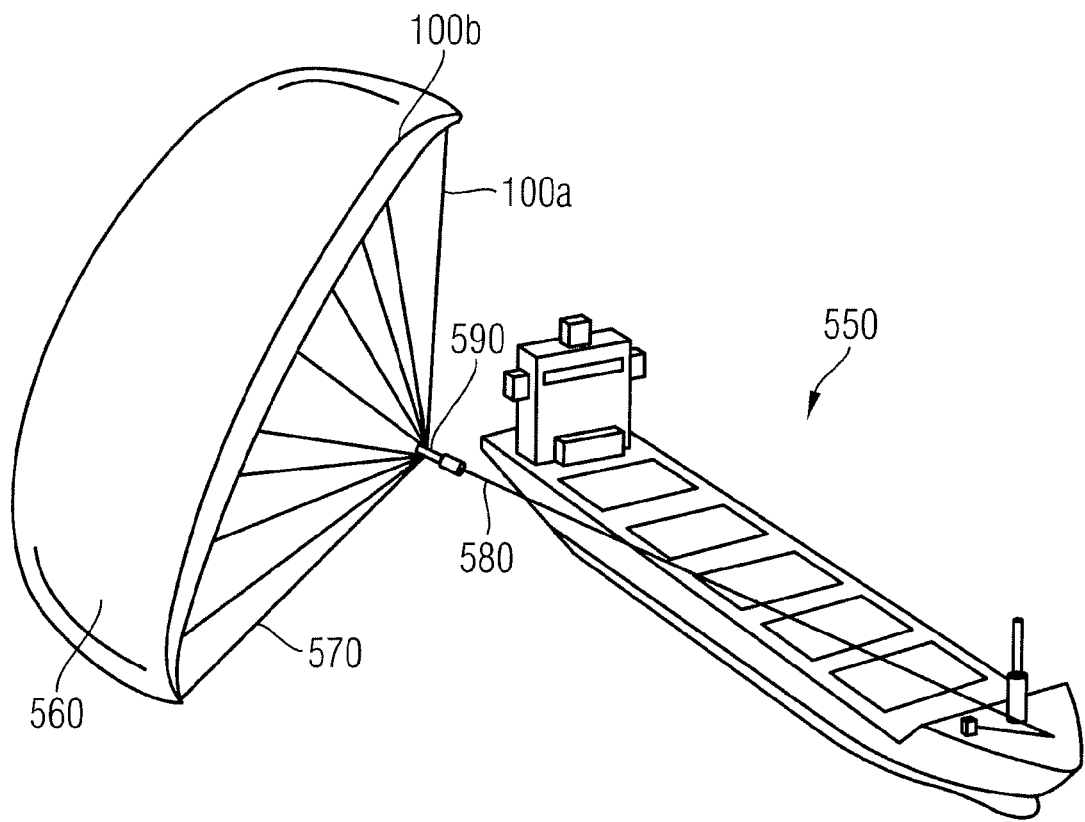
FIG. 7 shows a cargo ship powered by a steerable kite as an exemplary use of the sensor element.

FIG. 7 shows a further exemplary use of the sensor element according invention. FIG. 7 illustrates a cargo ship 550. The cargo ship is propelled in a manner known per se using a diesel engine and screw propulsion. In addition, the cargo ship 550 has an attachment apparatus for a steerable kite 560 on the bow. The steerable kite 560 can be used to generate additional drive power for the cargo ship 550 as long as the cargo ship is traveling in an area with aft winds. In this way, wind power can be used to save fuel.

The steerable kite 560 is attached to the bow of the cargo ship 550 using a connection rope 580. At the end of the connection rope 580 is a control device 590. The profile of the steerable kite 560 can be influenced by the control device 590 by sheeting out or in with the control lines 570. The corresponding control commands can be generated either by a control computer present in the cargo ship 550 or manually by operating personnel on the bridge of the ship.

According to the invention it is now proposed for the control ropes 570 to be equipped at least partially with a sensor element 100a and/or for at least one sensor element 100b to be introduced into the surface area of the steerable kite 560 by way of interweaving or lamination and/or for the connection line 580 to be equipped with a sensor element according to the invention. In this way, the sensor element according to the invention can be used to measure the forces prevailing in the control ropes 570 or the connection line 580. The profile of the steerable kite 560, which influences the drive power provided, can be indirectly determined using the sensor elements 100b introduced into the surface area of the steerable kite 560.

In order to optimize the drive power and thus the speed and/or the fuel saving of the cargo ship 550, an optimum profile for the steerable kite 560 in a flow simulation can now be calculated using a computer simulation. The simulation can in this case take into account as input variables the wave height, the wind speed, the prevailing wind direction and/or the current traveling speed. Subsequently, the actual profile of the steerable kite 560 can be determined with great accuracy by way of deformation of the sensor elements 100b. By trimming the steerable kite 560 by way of sheeting out or in with the control line 570, the actual profile of the steerable kite 560 can be matched to the desired nominal profile. The sensor elements 100a arranged in the connection rope 580 and/or in the control ropes 570 can in this case alert to impermissible force peaks and in the case of increasing wind permit lowering of the steerable kite 560 in good time.

If the steerable kite 560 is composed of a woven textile material, the sensor elements 100b can be interwoven into the surface area of the steerable kite 560 with predefinable spacing as a warp thread and/or as a weft thread. If the fabric of the steerable kite 560 is reinforced by a curing synthetic resin, the sensor elements 100b can be adhesively bonded over their entire lengths onto a textile fabric or be embedded in the resin layer. In other embodiments of the invention, the fabric of the steerable kite 560 can be composed of two film sheets. The film sheets can comprise a biaxially oriented polyester film. In other embodiments, the film sheets can be composed of polyethylene terephthalate which was subjected to a stretching method. The film sheets can be laminated to one another over their entire areas. Load-bearing fibers can be arranged between the film sheets, for example carbon fibers, aramid fibers or Pentex fibers. At least one of the proposed sensor elements can be introduced into the laminate between the load-bearing fibers.

In the same manner as described for a steerable kite above with reference to FIG. 7, other sail forms can also be equipped with the sensor element in order to influence their profiles by trim devices such that a specified ideal profile is achieved with as little deviation as possible. Such conventional sails comprise for example a headsail such as a foresail, a jib or a genua, a spinnaker, a gennaker, a main sail or a mizzen sail.

By introducing or applying the proposed sensor element on or in masts and spars, their deflection curve can also be precisely controlled. This permits the precise setting of mast controllers, shrouds or backstays.

In some embodiments of the invention, the proposed sensor element can be introduced into components of fiber-reinforced plastics. Such components can comprise the hull, the fin, the rudder blade, the keel or further components of a boat not mentioned here explicitly. In other embodiments, the components can be aircraft parts or rotor blades of wind power installations. The fiber-reinforced plastic can in addition to load-bearing fibers comprise a cured resin or a thermoplastic. The resin can be a polyester or an epoxide. The load-bearing fibers can comprise or be composed of glass fibers and/or carbon fibers and/or aramid fibers. The at least one sensor can be laminated into the component as a glass fiber directly together with the load-bearing fibers or be attached to the component by way of adhesive bonding or clamping.

The measurement values obtained with the sensor element regarding temperature and/or acting force and/or deformation can be used in the development for improving the structure of the component of fiber-reinforced plastic such that a component having lower weight and/or greater loading capacity is obtained. In other embodiments, the measurement values can be used for structural health monitoring in order to continually obtain indications regarding the functionality of the component. Damage, for example tears or deformation, can thus be detected early in order to take countermeasures before total failure occurs. In addition, the preventive exchange of safety-critical structures can be avoided and thus downtimes and maintenance outlay can be reduced.

The invention is of course not limited to the embodiments illustrated in the figures. The above description should therefore not be considered to be restrictive but illustrative. The following claims are to be understood such that a feature mentioned is present in at least one embodiment of the invention. This does not preclude the presence of further features. Where the claims and the above description define "first" and "second" features, this designation serves for differentiating between two similar features without defining a hierarchy.

The invention claimed is:

1. A sensor element for capturing mechanical state variables, including
    at least one optical waveguide comprising plurality of fiber Bragg gratings, wherein each fiber Bragg grating out of the plurality of fiber Bragg gratings has a different lattice constant,
    at least one planar-optical filter element to which light exiting the optical waveguide may be supplied,
    at least one measurement device being adapted to determine an intensity ratio of a Stokes line and an anti-Stokes line and a propagation time of an optical signal.

2. The sensor element according to claim 1, wherein the planar-optical filter element has a refractive index which corresponds approximately to the refractive index of the optical waveguide.

3. The sensor element according to claim 1, comprising further at least a first light source and at least a second light source being adapted to couple light into the at least one optical waveguide.

4. The sensor element according to claim 3, wherein the first light source comprises at least one superluminescent diode and/or the second light source comprises at least one short-pulse laser.

5. The sensor element according to claim 3, wherein the first light source is adapted to emit light of a first wavelength, and the second light source is adapted to emit light of a second wavelength being different from the first wavelength.

6. The sensor element according to claim 1, wherein the at least one planar-optical filter element comprises an arrayed waveguide grating and/or a Mach Zehnder interferometer and/or a delay line interferometer and/or a directional coupler.

7. The sensor element according to claim 1, wherein the wavelengths reflected on an undisturbed fiber Bragg grating are located approximately between the acceptance curves of the respective channels of the planar-optical filter element.

8. The sensor element according to claim 1, comprising further a multiplexer being adapted to connect a plurality of optical waveguides sequentially to at least one light source and/or to at least one planar-optical filter element.

9. The sensor element according to claim 1, comprising further a node point being adapted to supply the light exiting the optical waveguide to the planar-optical filter element and to the measurement device.

10. A sensor element for capturing mechanical state variables, including
    at least one optical waveguide, comprising at least one fiber Bragg grating,
    at least one planar-optical filter element to which light exiting the optical waveguide may be supplied, wherein the wavelengths reflected on an undisturbed fiber Bragg grating are located approximately between the acceptance curves of the respective channels of the planar-optical filter element, and
    at least one measurement device being adapted to determine an intensity ratio of a Stokes line and an anti-Stokes line and a propagation time of an optical signal.

11. The sensor element according to claim 10 further comprising a first light source and a second light source adapted to couple light into the at least one optical waveguide, wherein the first light source comprises at least one superluminescent diode and/or the second light source comprises a short-pulse laser.

12. The sensor element according to claim 10 further comprising a first light source and a second light source adapted to couple light into the at least one optical waveguide, wherein the first light source is adapted to emit light of a first wavelength, and the second light source is adapted to emit light of a second wavelength being different from the first wavelength.

13. The sensor element according to claim 10, wherein the at least one planar-optical filter element comprises an arrayed waveguide grating and/or a Mach Zehnder interferometer and/or a delay line interferometer and/or a directional coupler.

14. The sensor element according to claim 10, wherein the at least one fiber Bragg grating comprises a plurality of fiber Bragg gratings, wherein each fiber Bragg grating out of the plurality of fiber Bragg gratings has a different lattice constant.

15. A method for capturing mechanical state variables, comprising the following steps:

extending at least one optical waveguide along a measurement section, said waveguide comprising at least one fiber Bragg grating, coupling light from a first light source and from a second light source into the optical waveguide, wherein the first light source and the second light source operate in a pulsed manner, with the pulse and pause times being matched to each other such that the first light source operates at the pause times of the second light source and second light source operates at the pause times of the first light source, and supplying light reflected and/or scattered inside the optical waveguide to at least two measurement devices, wherein in the first measurement device determines the intensity of the light exiting the optical waveguide in selected spectral ranges and the second measurement device determines an intensity ratio of a Stokes line and an anti-Stokes line and a propagation time of an optical signal.

16. The method according to claim 15, wherein spectrally broadband radiation from a first light source and spectrally narrowband radiation from a second light source are coupled to the optical waveguide.

17. The method according to claim 15, wherein the first light source emits light with a first wavelength and the second light source emits light with a second wavelength which differs from the first wavelength.

* * * * *